United States Patent
Kuesel

(10) Patent No.: US 9,440,798 B2
(45) Date of Patent: Sep. 13, 2016

(54) CONDUCTOR LOOP, IN PARTICULAR FOR A CONVEYOR BELT

(75) Inventor: Bernd Kuesel, Hamburg (DE)

(73) Assignee: PHOENIX CONVEYOR BELT SYSTEMS GMBH, Bad Blankenburg (DE)

(*) Notice: Subject to any disclaimer, the term of this patent is extended or adjusted under 35 U.S.C. 154(b) by 852 days.

(21) Appl. No.: 13/242,148

(22) Filed: Sep. 23, 2011

(65) Prior Publication Data

US 2012/0012444 A1 Jan. 19, 2012

Related U.S. Application Data

(63) Continuation of application No. PCT/EP2010/053669, filed on Mar. 22, 2010.

(30) Foreign Application Priority Data

May 20, 2009 (DE) .................. 10 2009 025 848

(51) Int. Cl.
| | |
|---|---|
| *B65G 15/34* | (2006.01) |
| *B65G 43/02* | (2006.01) |
| *B65G 15/36* | (2006.01) |

(52) U.S. Cl.
CPC .............. *B65G 43/02* (2013.01); *B65G 15/36* (2013.01)

(58) Field of Classification Search
USPC .................................................. 198/846, 847
See application file for complete search history.

(56) References Cited

U.S. PATENT DOCUMENTS

| | | | | |
|---|---|---|---|---|
| 4,589,584 | A | * | 5/1986 | Christiansen et al. ...... 228/111.5 |
| 4,621,727 | A | | 11/1986 | Strader |
| 5,579,137 | A | * | 11/1996 | Shimizu .......................... 349/84 |
| 6,352,149 | B1 | | 3/2002 | Gartland |
| 6,605,483 | B2 | * | 8/2003 | Victor et al. ..................... 438/22 |
| 6,740,808 | B1 | * | 5/2004 | Chang .............................. 174/36 |
| 6,962,228 | B2 | * | 11/2005 | Ogino et al. .................. 180/274 |
| 6,975,793 | B2 | * | 12/2005 | Cole et al. ....................... 385/33 |
| 7,165,457 | B2 | * | 1/2007 | Ogino et al. .................... 73/700 |
| 7,174,790 | B2 | * | 2/2007 | Ogino et al. .................... 73/849 |
| 7,178,663 | B2 | * | 2/2007 | Schnell .................... 198/810.03 |
| 8,034,053 | B2 | * | 10/2011 | Whayne et al. ................ 606/49 |
| 8,093,782 | B1 | * | 1/2012 | Hossack ....................... 310/327 |
| 2002/0013013 | A1 | * | 1/2002 | Victor et al. ..................... 438/57 |
| 2006/0118394 | A1 | | 6/2006 | Schnell |
| 2007/0008156 | A1 | * | 1/2007 | Ueda et al. .................... 340/575 |
| 2007/0278214 | A1 | | 12/2007 | Weiss et al. |
| 2009/0218854 | A1 | * | 9/2009 | Pfahler et al. ........... 297/180.12 |

FOREIGN PATENT DOCUMENTS

| | | |
|---|---|---|
| DE | 1556723 | 8/1970 |
| DE | 4014475 | 10/1990 |
| DE | 4444264 | 4/1996 |
| DE | 19607867 | 9/1997 |
| DE | 19827120 | 12/1999 |
| DE | 19831854 | 1/2000 |
| DE | 10100249 | 7/2001 |

(Continued)

*Primary Examiner* — Joseph Dillon, Jr.
(74) *Attorney, Agent, or Firm* — Greenblum & Bernstein, P.L.C.

(57) ABSTRACT

A conductor loop and a conveyor belt including the conductor loop. The conductor loop is embedded in an article having a base of a polymer material with elastic properties. The conductor loop includes at least one hybrid yarn having at least a textile first material and a conductive second material closed in an endless manner.

6 Claims, 2 Drawing Sheets

(56) References Cited

FOREIGN PATENT DOCUMENTS

| EP | 0213057 | 3/1987 |
| EP | 1097094 | 5/2001 |
| GB | 1246786 | 9/1971 |
| WO | 2005/030621 | 4/2005 |
| WO | 2005/089019 | 9/2005 |

\* cited by examiner

CONDUCTOR LOOP, IN PARTICULAR FOR A CONVEYOR BELT

CROSS-REFERENCE TO RELATED APPLICATIONS

The present application is a Continuation of International Patent Application No. PCT/EP2010/053669 filed Mar. 22, 2010, the disclosure of which is expressly incorporated by reference herein in its entirety. Moreover, this application claims priority under 35 U.S.C. §119 of German Patent Application No. 10 2009 025 848.5 filed May 20, 2009.

BACKGROUND OF THE INVENTION

1. Field of the Invention

Embodiments of the invention relate to a conductor loop, which is completely embedded in an article. The article includes a base body of a polymer material with elastic properties. The two relevant polymer material groups are elastomers or thermoplastic elastomers. Usually, the article is additionally provided with a strengthening support, in particular, embedded completely in the elastic base body. The conductor loop is used in particular for a conveyor belt.

2. Discussion of Background Information

With regard to conductor loop technology, reference is made in particular to the following patent literature: DE 40 14 475 A1; DE 44 44 264 C1; DE 196 07 867 A1; DE 198 27 120 A1; DE 198 31 854 A1; DE 101 00 249 A1; EP 0 213 057 A1; EP 1 097 094 B1; WO 2005/030621 A1; AU 57 558 B; GB 1 246 786 A; and U.S. Pat. No. 4,621,727, the disclosures of which are expressly incorporated by reference herein in their entireties.

Conveyor belt conductor loop technology is discussed in more detail below.

It is usual to provide conveyor belts with conductor loops in order to detect the occurrence of longitudinal rips. These conductor loops are checked for intactness with the aid of a transmitter/receiver combination. If a longitudinal rip occurs in the conveyor belt, the conductor loop is also destroyed and the transmitter/receiver transmission path is interrupted. This provides a criterion for stopping a conveyor belt at the beginning of the ripping process and limiting the length of the rip. The maximum possible length of the rip is thereby restricted to the distance between two conductor loops. Unfortunately, after the conveyor belts have been in use for some time, false alarms occur with increasing frequency, caused by the conductor loop being destroyed without a rip occurring in the belt.

The conductor loops often includes metal cords, in particular steel cords, incorporated in a meandering form. The cords usually include in turn of at least five stranded wires or flexes. A cord structure of the type 7×7 is preferred for this, with a single wire diameter of approximately 0.2 mm and a total diameter of 1.5 mm to 2 mm. There are also variants including a mixed structure of copper stranded wires and steel stranded wires, particularly with the steel stranded wires enclosing the copper stranded wires. A version including a solid copper wire enclosed by steel stranded wires is also known.

The meandering structure (DE 196 07 867 A1, FIG. 1) is particularly suitable for increasing the extensibility of the loops, since they would otherwise be destroyed after a relatively short time by the mechanical stressing in the conveyor belt, to be specific flexural stress and applied stress. Producing the meander requires the use of a relatively ductile material, which however has adverse effects on the lifetime of the conductor loop. Although materials with higher elasticity improve the fatigue strength of the individual cord, they make it more difficult to form this meander. The use of so-called "high elongation" cords (HE cords), which are able to extend more than the cords as a result of their structure, also improves the lifetime, but likewise makes it more difficult to form the meanders.

The laid-open patent application DE 101 00 249 A1 presents a conductor loop which has a higher cord mass within the peripheral region of the conveyor belt than in the central region of the conveyor belt. At the same time, the conductor loop is also free from crossing points. With such a structural design, it is possible to achieve a higher electromagnetic sensitivity.

The laid-open patent application WO 2005/030621 A1 concerns a recent conductor loop development. For the purpose of providing a highly flexible and highly extensible conductor loop with an increased lifetime, it proposes forming the conductor loop as an open flex helix, wherein each individual wire is enclosed by a polymer material with elastic properties. This measure also prevents internal friction between the wires.

The drawbacks of conductor loops of the prior art specified here, according to which the conductor loop cords usually include steel, is their susceptibility to corrosion, their low flexibility, in spite of the measures according to WO 2005/030621 A1, their low extensibility and, finally, the fallible connection within the endless closure.

SUMMARY OF THE EMBODIMENTS

Against the background of the overall problem stated above, embodiments of the invention provide, in particular for a conveyor belt, a conductor loop which is distinguished by high flexibility with at the same time material resistance, combined with a long service life. Furthermore, the conductor loop is intended to be receptive to all possibilities in terms of structural design.

Accordingly, embodiments include a conductor loop being formed by at least one hybrid yarn, which in turn includes at least a textile first material and a conductive second material, once it has been closed in an endless manner.

The textile first material is preferably a polyamide (PA), aramid, polyester (PES), polyvinyl acetal (PVA), polyimide (PI), polyetherether ketone (PEEK) or a polyphenylene. From the group of polyphenylenes, a polyphenylene sulfide (PPS) is particularly significant. Usually, however, a PA is used, the following types in turn being notable:

polyamide 6
polyamide 6.6
polyamide 11
polyamide 12
polyamide 6.10
polyamide 6.12
copolymers.

The conductive second material is a corrosion-resistant metal or a conductive plastic. Of particular significance is a high-grade metal, in particular in the form of silver, in particular in turn as pure silver. In the case of a conductive plastic, conductive particles, for example metal or carbon fibers, are mixed into the plastic.

The textile first material usually forms the core and the conductive second material forms the sheath of the hybrid yarn. The sheathing in this case takes place galvanically or electrochemically.

It is also of advantage if at least two hybrid yarns form a yarn composite, to be precise in the form of a cord or twisted thread. The textile first material may include, for example, of a single material, for example of PA. However, a blend may also be used, for example PA and PES. The yarn composite has a thickness of 0.5 mm to 2 mm.

The hybrid yarn or the yarn composite is connected by a conductive adhesive, by crimping or soldering with low-melting solder to form an electric circuit. With this material concept, an endless connection with a long lifetime is realized.

A series of tests have shown that, when using a hybrid yarn of PA as the textile core and pure silver as the conductive sheath, particularly good conductivity with high flexibility can be achieved. The conductivity here is approximately $5 \times 10^4$ ohms, which corresponds to 20 ohms per meter. This reliably allows inductive sensing of the current by commercially available instruments.

Embodiments of the invention are directed to a conductor loop embedded in an article having a base of a polymer material with elastic properties. The conductor loop includes at least one hybrid yarn having at least a textile first material and a conductive second material closed in an endless manner.

According to embodiments, the textile first material may include one of a polyamide (PA), aramid, polyester (PES), polyvinyl acetal (PVA), polyimide (PI), polyetherether ketone (PEEK) or a polyphenylene.

In accordance with other embodiments of the invention, the conductive second material includes one of a corrosion-resistant metal or a conductive plastic. Further, the conductive second material can include a high-grade metal. Still further, the conductive second material can include silver.

According to still other embodiments, the textile first material may form a core and the conductive second material may form a sheath of the hybrid yarn.

Moreover, the at least one hybrid yarn can include at least two hybrid yarns forming a yarn composite. The yarn composite can include a cord or a twisted thread. Further, the yarn composite may have a thickness of 0.5 mm to 2 mm.

Embodiments of the instant invention are directed to a conveyor belt that includes a carrying-side outer sheet and a running-side outer sheet, in which the outer sheets each inlcudes a polymer material with elastic properties. A strengthening support is arranged between the two outer sheets, and an embedded conductor loop includes at least one hybrid yarn that includes at least a textile first material and a conductive second material closed in an endless manner.

In accordance with embodiments of the invention, the textile first material comprises one of a polyamide (PA), aramid, polyester (PES), polyvinyl acetal (PVA), polyimide (PI), polyetherether ketone (PEEK) or a polyphenylene.

According to other embodiments, the conductive second material can include one of a metal or a conductive plastic. Further, the conductive second material may include one of a corrosion-resistant metal or a conductive plastic. Still further, the conductive second material may include a high-grade metal. Moreover, the conductive second material comprises silver.

In accordance with still other embodiments, the textile first material may form a core and the conductive second material may form a sheath of the hybrid yarn.

According to further embodiments, the at least one hybrid yarn can include at least two hybrid yarns forming a yarn composite. The yarn composite may include one of a cord or a twisted thread. Further, the yarn composite can have a thickness of 0.5 mm to 2 mm.

In accordance with still yet other embodiments of the present invention, the conductor loop can be embedded in the carrying-side outer sheet.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
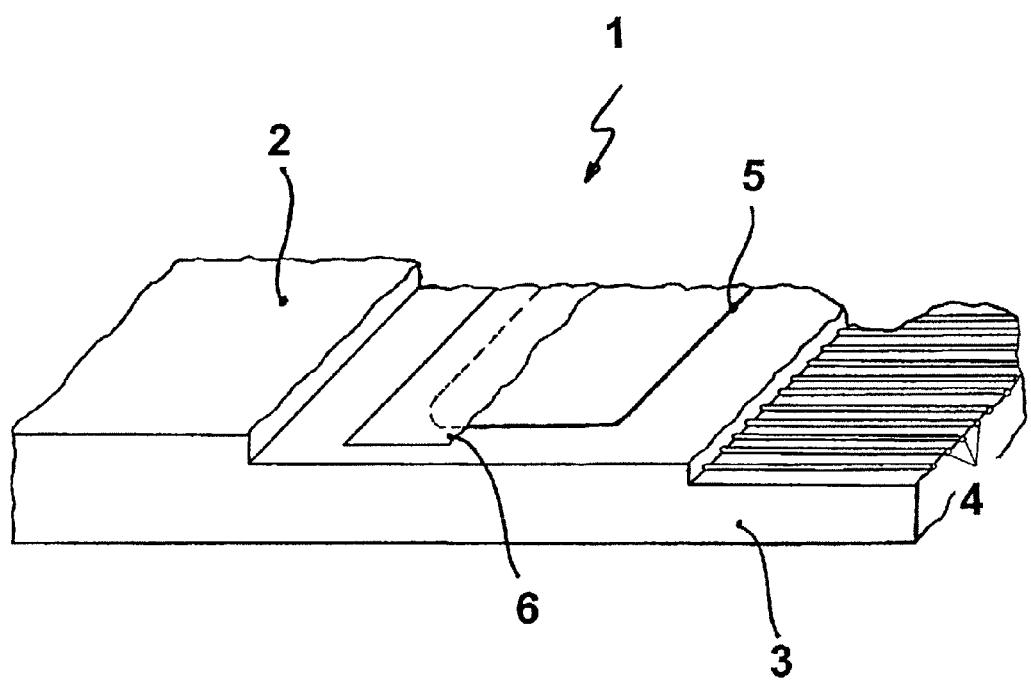
FIG. 1 illustrates a conveyor belt with a conductor loop.

FIG. 1 shows a conveyor belt 1, which include a carrying-side outer sheet 2 and a running-side outer sheet 3, each of a polymer material with elastic properties. The polymer material is, in particular, a vulcanized rubber mixture, for example on the basis of a chloroprene rubber (CR). Embedded between these two outer sheets 2, 3 is a strengthening support 4 in the form of steel cables. Then, completely embedded within the carrying side 2 is a conductor loop 5 according to embodiments. The prior art provides that the conductor loop may be additionally fixed on a carrier fabric 6 (DE 198 31 854 A1).

Until now, conductor loops 5 have been fitted at intervals of 50 m to 150 m. Against the background of the new hybrid yarns on the basis of a lighter textile material, the spacing could be reduced to, for example, 10 m (from the customary 100 m), whereby the dependability of the conveyor belt is significantly increased.

Figure 2:
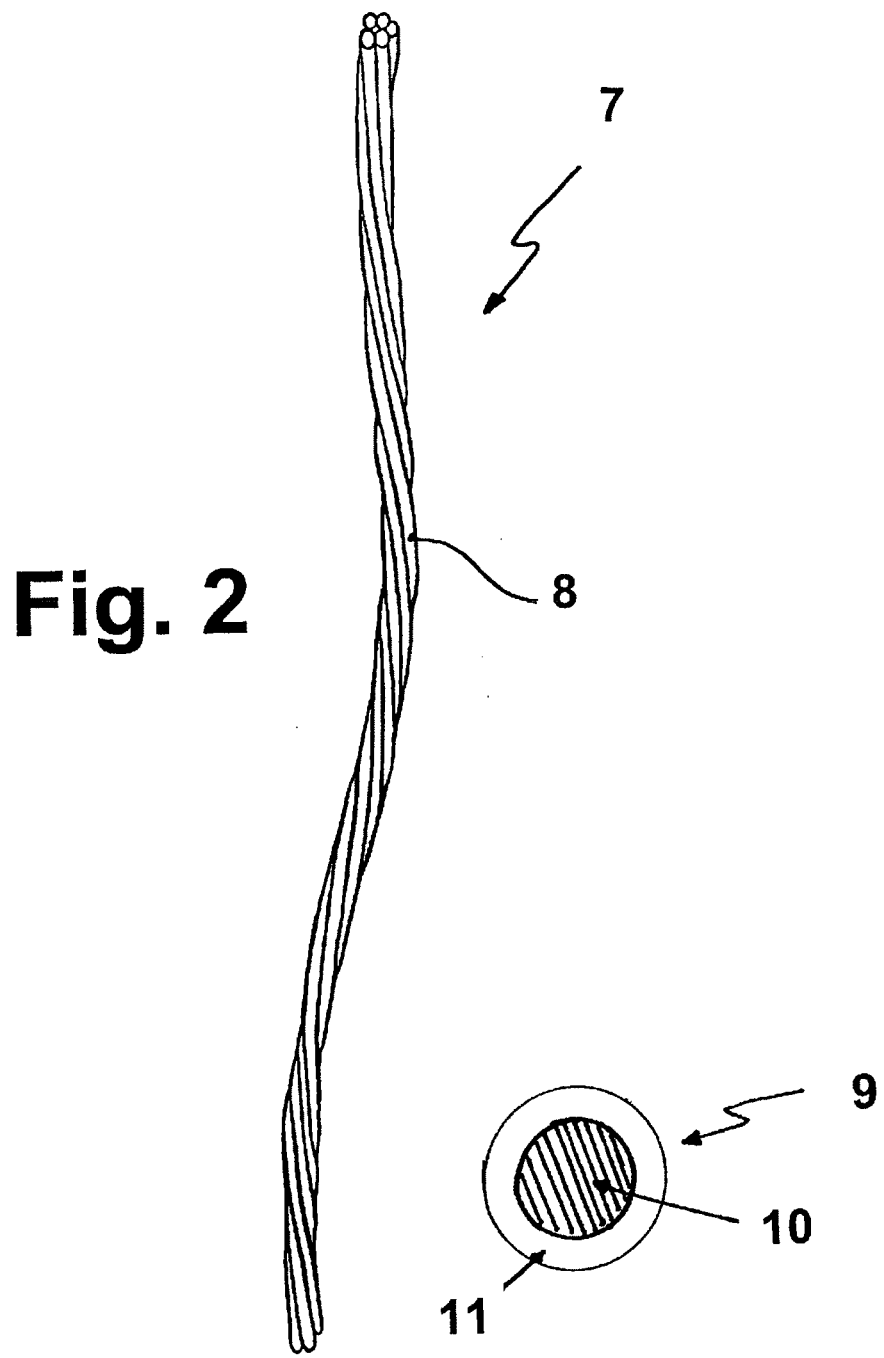
FIG. 2 illustrates a yarn composite.

FIG. 2 shows an embodiment of a yarn composite 7 formed by a number of hybrid yarns 8, in order to achieve a highly flexible cord.

Figure 3:
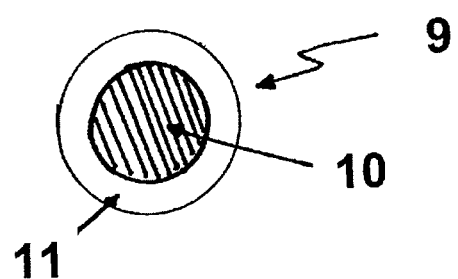
FIG. 3 illustrates a hybrid yarn.

FIG. 3 illustrates a preferred structure of a hybrid yarn 9. According to embodiments, the textile first material 10, for example formed of a PA, forms the core, and consequently has a carrier function. The conductive second material 11, for example pure silver, completely sheathes the core. In this case, the sheath has a smaller thickness in comparison with the core.

Even if such a conductor loop is mainly used for a conveyor belt, it can also be used for an article with an outer layer that is susceptible to wear, in particular from the aspect of being ripped open. It is also understood that emodiments may find utility by being formed, e.g., as a tubular body, for floats of offshore installations and air spring lobes.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

LIST OF DESIGNATIONS (Part of the Description)
1 conveyor belt
2 carrier-side outer sheet
3 running-side outer sheet
4 strengthening support
5 conductor loop
6 carrier fabric
7 yarn composite
8 hybrid yarn
9 hybrid yarn
10 textile first material
11 conductive second material

What is claimed:

1. A conductor loop embedded in an article having a base of a polymer material with elastic properties, the conductor loop comprising:
    at least one hybrid yarn that comprises at least a textile first material and a conductive second material and that is closed in an endless manner,
    wherein the conductive second material comprises one of a corrosion-resistant metal or a conductive plastic.

2. The conductor loop as claimed in claim 1, wherein the conductive second material comprises a high-grade metal.

3. The conductor loop as claimed in claim 2, wherein the conductive second material comprises silver.

4. A conductor loop embedded in an article having a base of a polymer material with elastic properties, the conductor loop comprising:
    at least one hybrid yarn that comprises at least a textile first material and a conductive second material and that is closed in an endless manner,
    wherein the at least one hybrid yarn comprises at least two hybrid yarns forming a yarn composite.

5. The conductor loop as claimed in claim 1, wherein the yarn composite is a cord or a twisted thread.

6. The conductor loop as claimed in claim 1, wherein the yarn composite has a thickness of 0.5 mm to 2 mm.

* * * * *